UNITED STATES PATENT OFFICE.

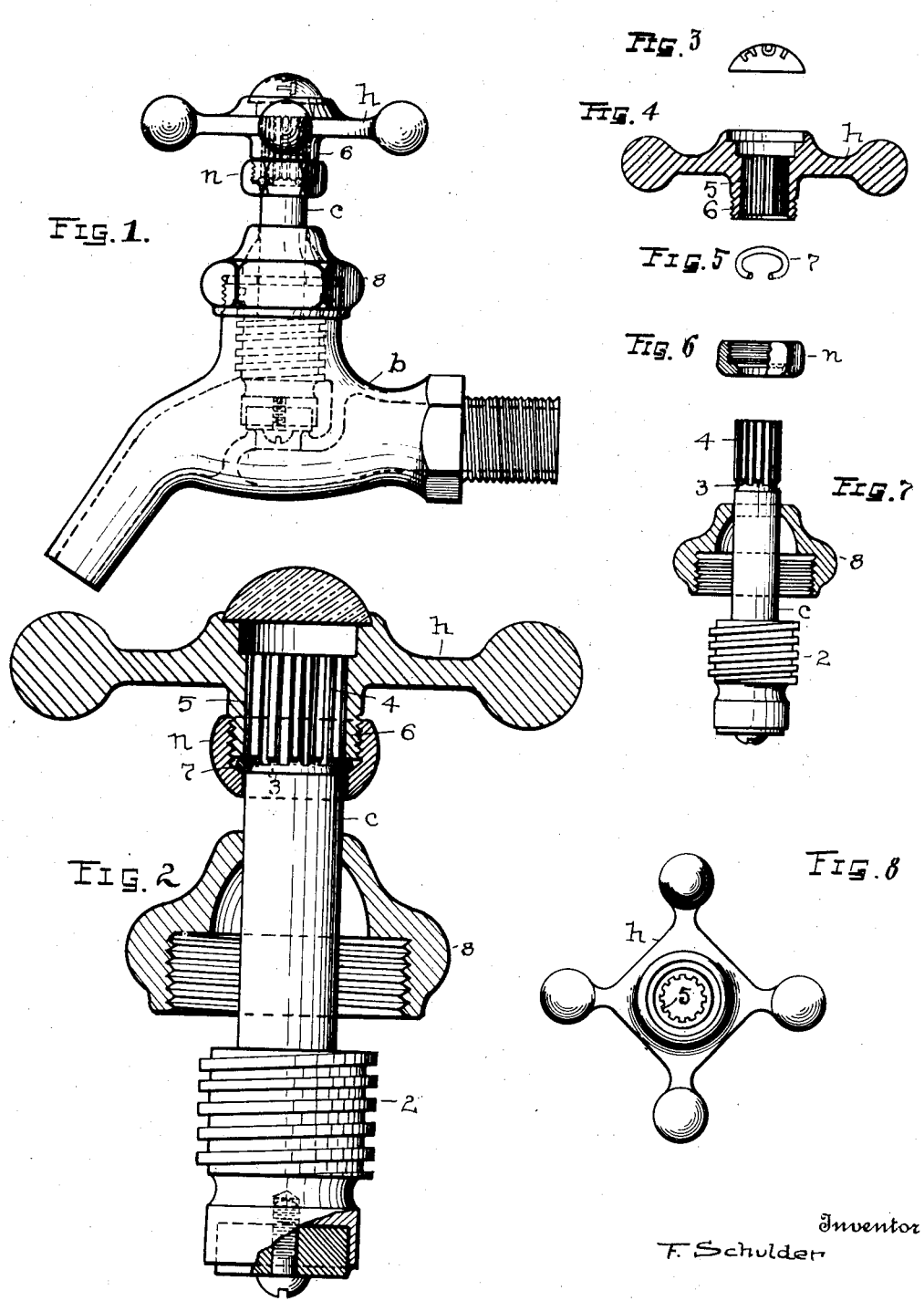

FRED SCHULDER, OF CLEVELAND, OHIO, ASSIGNOR TO UNITED BRASS MANUFACTURING COMPANY, OF CLEVELAND, OHIO, A PARTNERSHIP COMPOSED OF WM. J. SCHOENBERGER AND BENJAMIN F. KLEIN.

COCK OR FAUCET.

1,391,012.  Specification of Letters Patent.  Patented Sept. 20, 1921.

Application filed October 11, 1920. Serial No. 416,163.

*To all whom it may concern:*

Be it known that I, FRED SCHULDER, citizen of the United States, residing at Cleveland, in the county of Cuyahoga and State of Ohio, have invented certain new and useful Improvements in Cocks or Faucets, of which the following is a specification.

This invention pertains to an improvement in cocks or faucets, in which the special construction of the valve stem and the handle engaged therewith constitute the novel features.

In the accompanying drawings, Figure 1 is a side elevation of a cock or faucet embodying my invention and Fig. 2 is an enlarged elevation of the valve stem, a sectional elevation of the screw cap on said stem and a section of the handle and the parts by which the handle is fixed on the stem. Figs. 3 to 8 show details, Fig. 3 being a detail of the glass or porcelain index disk or plate marked in this instance for hot water but it might be for "cold"; Fig. 4 is a sectional elevation of the handle; Fig. 5 a detail of the split ring adapted to encircle the top portion of the valve stem, and Fig. 6 a section of the nut engaging the same; Fig. 7 is an elevation of the valve stem and a section of the screw cap by which the stem is confined on the faucet body. Fig. 8 is a plan view of the handle.

As thus shown $b$ represents the body of the faucet or cock and $c$ is the valve stem, which has an enlarged screw-threaded portion 2 adapted to engage in a correspondingly threaded portion of the said body and whereby the valve stem is made rotatable to and from its seat. Near its top the said stem is provided with an annular groove or channel 3, and the handle $h$ is engaged on the fluted, corrugated or equivalently formed extremity 4 thereof by its correspondingly formed and adapted hub 5, whereby any desired adjustment of the handle can be made. This hub has an exteriorly threaded neck 6 at its bottom and the handle is rigidly confined on said stem by an interiorly threaded nut $n$ sleeved on the valve stem from the top and contracted about its bottom to engage beneath a split wire ring 7 confined in the said groove 3. The larger diameter of said nut has its threads engaged upon the neck 6 and serves to bind the handle upon the valve stem by reason of its upward bearing against the ring 7 from beneath, thus making said ring serve as a shoulder for the nut with the edge of the said neck bearing thereon from above.

Having the index setting fixed in the top of the handle the handle is set on the spindle to afford correct reading and then fastened by means of nut $n$. This nut makes a neat ornamental finish and provides a longitudinal take-up for wear and slight imperfections in manufacture. Moreover the use of a nut and ring as herein described and shown simplify the steps and cost of manufacture and avoid weakening of the stem, compared with present practices, inasmuch as no side set screw and no side opening for seating a set screw in the stem are required and all side drilling and tapping operations are eliminated. In the present invention the corrugations or flutes 4 are formed by machine operations which move longitudinally of the stem from its outer end to the annular groove 3, and the split ring when occupying this groove bears against the inner ends of the ribs or corrugations.

What I claim is:

1. In a cock or faucet, a valve stem having a fluted extremity and an annular groove below its fluted portion, a handle adapted to be rotatably adjusted on said stem and having a hub with external screw threads at its bottom, a split ring in said groove and a nut engaging said ring from below and screwed on to said hub above said ring, whereby said stem and handle are locked rigidly together.

2. A cock or faucet, comprising a valve stem having an annular groove near its upper end and constructed above said groove to receive a handle with a rotatable adjustment thereon, a handle engaged on said stem having a hub with an externally threaded neck at its bottom, a split ring in said groove and a nut sleeved on said stem and having a relatively contracted bottom portion bearing against said ring and screwed onto said neck on the hub of the handle.

Signed at Cleveland, in the county of Cuyahoga, and State of Ohio, this 6th day of October, 1920.

FRED SCHULDER.